(12) United States Patent
Camenares et al.

(10) Patent No.: US 11,699,437 B2
(45) Date of Patent: Jul. 11, 2023

(54) SYSTEM AND METHOD FOR QUANTIFYING MEETING EFFECTIVENESS USING NATURAL LANGUAGE PROCESSING

(71) Applicant: Capital One Services, LLC, McLean, VA (US)

(72) Inventors: Christopher Camenares, Falls Church, VA (US); Jason Trost, Atlanta, GA (US); Patrick Sofo, Arlington, VA (US); Joseph Boayue, Reston, VA (US); Geeta Shyamala, Herndon, VA (US); Ana Cruz, Arlington, VA (US); Nahid Farhady Ghalaty, Fairfax, VA (US); Vincent Pham, Champaign, IL (US)

(73) Assignee: Capital One Services, LLC, McLean, VA (US)

(*) Notice: Subject to any disclaimer, the term of this patent is extended or adjusted under 35 U.S.C. 154(b) by 345 days.

(21) Appl. No.: 16/925,903

(22) Filed: Jul. 10, 2020

(65) Prior Publication Data
US 2022/0013114 A1 Jan. 13, 2022

(51) Int. Cl.
| | | |
|---|---|---|
| G10L 15/08 | (2006.01) | |
| G10L 15/183 | (2013.01) | |
| G10L 15/18 | (2013.01) | |
| G10L 17/00 | (2013.01) | |
| G10L 17/02 | (2013.01) | |
| G10L 17/04 | (2013.01) | |
| G10L 15/22 | (2006.01) | |
| G06N 20/00 | (2019.01) | |
| G06F 3/16 | (2006.01) | |

(52) U.S. Cl.
CPC .............. *G10L 15/22* (2013.01); *G06F 3/167* (2013.01); *G06N 20/00* (2019.01); *G10L 15/18* (2013.01); *G10L 2015/223* (2013.01)

(58) Field of Classification Search
USPC ..... 382/155–159, 170, 224–229; 704/1–275; 706/1–25, 38–45
See application file for complete search history.

(56) References Cited

U.S. PATENT DOCUMENTS

| | | |
|---|---|---|
| 7,962,525 B2 | 6/2011 | Kansal |
| 9,413,891 B2 | 8/2016 | Dwyer et al. |
| 9,875,225 B1 | 1/2018 | Grueneberg et al. |
| 10,142,461 B2 | 11/2018 | Gainsboro et al. |

(Continued)

*Primary Examiner* — Marcellus J Augustin
(74) *Attorney, Agent, or Firm* — Perkins Coie LLP (57) ABSTRACT

Systems, methods, and computer-readable storage media for quantifying meeting effectiveness for an individual. A system configured as disclosed herein uses data from multiple meetings in which a user participated to create a user profile for the user. The system then receives data related to a new meeting in which the user participated, processes the new meeting data into segments using natural language processing, tags the resulting segments based on contexts, and compares the tagged segments to the user profile to generate a meeting effectiveness score for the new meeting which is specific to the user. The system can use machine learning to iteratively improve an ability of the system to generate the tagged segments using historical meeting data and updating that historical meeting data with each iteration of scoring a meeting's effectiveness.

21 Claims, 5 Drawing Sheets

(56) References Cited

U.S. PATENT DOCUMENTS

| | | | |
|---|---|---|---|
| 10,263,799 B1* | 4/2019 | Jouhikainen | G06Q 10/00 |
| 10,311,485 B2 | 6/2019 | Gilbert et al. | |
| 11,121,885 B2* | 9/2021 | Waugh | H04L 67/306 |
| 2007/0071206 A1 | 3/2007 | Gainsboro et al. | |
| 2016/0117624 A1 | 4/2016 | Flores et al. | |
| 2018/0007100 A1* | 1/2018 | Krasadakis | G06Q 10/1095 |
| 2018/0046957 A1* | 2/2018 | Yaari | G06Q 10/1095 |
| 2018/0330736 A1* | 11/2018 | Faulkner | G10L 17/00 |
| 2019/0349112 A1* | 11/2019 | Seno | H04B 10/548 |
| 2019/0364009 A1* | 11/2019 | Joseph | H04M 15/755 |
| 2019/0392837 A1* | 12/2019 | Jung | H04L 12/1831 |
| 2020/0403816 A1* | 12/2020 | Daredia | G06V 40/164 |
| 2020/0403817 A1* | 12/2020 | Daredia | H04L 12/1818 |
| 2021/0375289 A1* | 12/2021 | Zhu | G10L 15/26 |

* cited by examiner

SYSTEM AND METHOD FOR QUANTIFYING MEETING EFFECTIVENESS USING NATURAL LANGUAGE PROCESSING

BACKGROUND

1. Technical Field

The present disclosure relates to quantifying meeting effectiveness using natural language processing, and more specifically to quantifying how effective a meeting was for a participant word usage (obtained through speech-to-text processing and natural language processing) and user profiles.

2. Introduction

Metrics regarding meeting participation and efficiency do not take into account the actual speaking time of the participants, words used by participants, and other quantitative aspects of the meeting. Because of this lack of quantification, meeting participation and efficiency is often incorrectly estimated using guesswork rather than being based on quantifiable, collected data.

SUMMARY

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed are systems, methods, and non-transitory computer-readable storage media a technical solution to the technical problem described. A method for performing the concepts disclosed herein can include: receiving, at a server, meeting data for a plurality of meetings in which a first user participated, the meeting data comprising transcripts for each meeting in the plurality of meetings; generating, via a processor associated with the server and based on the transcripts, a first user profile for the first user; receiving additional meeting data for a new meeting in which the first user participated; processing, via the processor executing natural language processing algorithms, the additional meeting data into segments; tagging, via the processor, the segments based on respective contexts, resulting in tagged segments; comparing, via the processor, the tagged segments to the first user profile, resulting in a comparison; generating, via the processor based on the additional meeting data and the comparison, a meeting effectiveness score of the additional meeting data for the first user; and using, via the processor, machine learning to iteratively improve an ability of the processor to generate the tagged segments within the new meeting based on at least one of a context of the new meeting, a speaking party within the new meeting, a relative time period within the new meeting, or a style of presentation, wherein the machine learning accesses a database of historical meeting data, and wherein with each iteration of meeting analysis additional meeting data is saved in the database of historical meeting data.

A system configured to perform the concepts disclosed herein can include a processor; and a non-transitory computer-readable storage medium having instructions stored which, when executed by the processor, cause the processor to perform operations comprising: receiving audio input from a meeting between a plurality of individuals; performing speech-to-text processing on the audio input, resulting in a transcript of the audio input; performing natural language processing on the audio input using audio footprints of known users, resulting in (1) an identification of a plurality of speakers during the meeting, and (2) a plurality of audio segments, each audio segment in the plurality of audio segments associated with at least one speaker in the plurality of speakers; identifying, based on the transcript and the plurality of audio segments, a context for each audio segment, resulting in contexts of the plurality of audio segments; receiving a user profile for a user who attended the meeting; comparing the user profile to meeting data associated with the meeting, the meeting data comprising the plurality of audio segments and the contexts of the plurality of audio segments, resulting in a comparison; generating a meeting score based on the comparison, the meeting score indicative of how effective the meeting was for the user.

A non-transitory computer-readable storage medium configured as disclosed herein can have instructions stored which, when executed by a computing device, cause the computing device to perform operations which include at a first time: receiving, from a user, at least one meeting effectiveness metric; transmitting the at least one meeting effectiveness metric to a server; at a second time, after a first meeting which occurs after the first time: receiving, from the server, a meeting effectiveness score, wherein the meeting effectiveness score is generated by: performing natural language processing on audio input from the first meeting, resulting in a transcript of the audio input; performing natural language processing on the audio input using audio footprints of known users, resulting in an identification of a plurality of speakers during the first meeting; segmenting the audio input based upon when the plurality of speakers speak during the first meeting, resulting in audio segments; identifying, based on topics discussed during each audio segment in the audio segments, contexts for each audio segment; comparing a user profile of the user to the audio segments and to the contexts of the plurality of audio segments, resulting in a comparison; and generating the meeting effectiveness score of the first meeting based on the comparison; and modifying a scheduled meeting based on the meeting effectiveness score of the first meeting.

DETAILED DESCRIPTION

Various embodiments of the disclosure are described in detail below. While specific implementations are described, it should be understood that this is done for illustration purposes only. Other components and configurations may be used without parting from the spirit and scope of the disclosure.

The present disclosure addresses how to quantifiably determine a meeting's effectiveness for an individual without the subjectivity inherent when human beings try to determine a meeting's effectiveness. Systems, methods, and computer-readable media are disclosed which use information about how a user has previously participated in meetings and information provided by the user about their current goals or objectives to create a user meeting profile, the user profile containing data/statistics about what makes a meeting effective for that user.

As the user participates in future meetings, data about a specific meeting can be extracted from media such as audio or video, then compared to the user meeting profile to quantifiably determine if the meeting was effective for the user. Extracting data from the media can, for example, entail using speech to text processing to convert the audio/video recording to an electronic transcript. Additional meeting data, in the form of already executed transcripts, meeting notes, emails, etc., can, in some circumstances, also be used as inputs (electronic transcripts) to the system. The system can then use processor based natural language processing on the resulting electronic transcript to identify syntax, prosody (relying on timestamps within the electronic transcripts), vocabulary, and other aspects of how the user communicates. The system can also execute a statistical analysis on aspects of the user's speech identified by the natural language processing, then use the data from the natural language processing and the statistical analysis to generate a meeting profile for the individual user, with the meeting profile identifying how the user prefers to interact in meetings. The meeting profile can also include goals, criteria, or other factors entered by the user themselves. For example, the user can indicate what they value in meetings, what their goals are, if there are specific individuals (or characteristics of individuals) that they do not enjoy, etc.

When the user participates in a new meeting, the system can then compare the user's meeting profile to an electronic transcript of the meeting, where the electronic transcript is subjected natural language processing and/or statistical analysis, to generate a meeting effectiveness score which is tailored to the user based on the user's profile and based on what was said during the meeting, who spoke during the meeting, who was present/participated in the meeting, etc.

In some cases, the meeting effectiveness score can then be used to modify scheduled future meetings by sending out electronic modifications to already distributed electronic meeting invitations. For example, if after a meeting the meeting effectiveness scores were poor for the majority of the individuals in the meeting, the system can change the topic, agenda, order of speakers, time of meeting, participants, etc., to change the already distributed electronic meeting data such as the electronic meeting invitations.

In addition, in some configurations the system can use machine learning to iteratively improve itself using the meeting effectiveness score. Specifically, the machine learning process deployed by the system can, with each meeting effectiveness evaluation/score, access a database storing previous meeting information, compare the current meeting information to the previous meeting information stored in the database, and change how the processor of the system evaluates aspects of the meeting such as context, speakers, specific times within the meeting (such as a five minute window after a participant arrives, or while a specific context is being discussed), styles of presentation, etc. The change to the processor code can occur directly within the processor or within a non-transitory computer-readable device electronically connected to the processor and from which the processor obtains executable code. In practice, modification of the processor code can often take the form of modifying the weights at which the various factors of meeting effectiveness are evaluated by the processor, where the weights are adapted based on meeting effectiveness scores of one or more users, user behavior (e.g., did the user modify aspects of their meeting profile immediately upon seeing a meeting effectiveness score? If so, that may indicate the user perceives a flaw in how the score is generated), future meetings organized by the participants, etc.

These and other variations shall be further described herein as the various illustrates are described. The disclosure now turns to FIG. 1.

Figure 1:
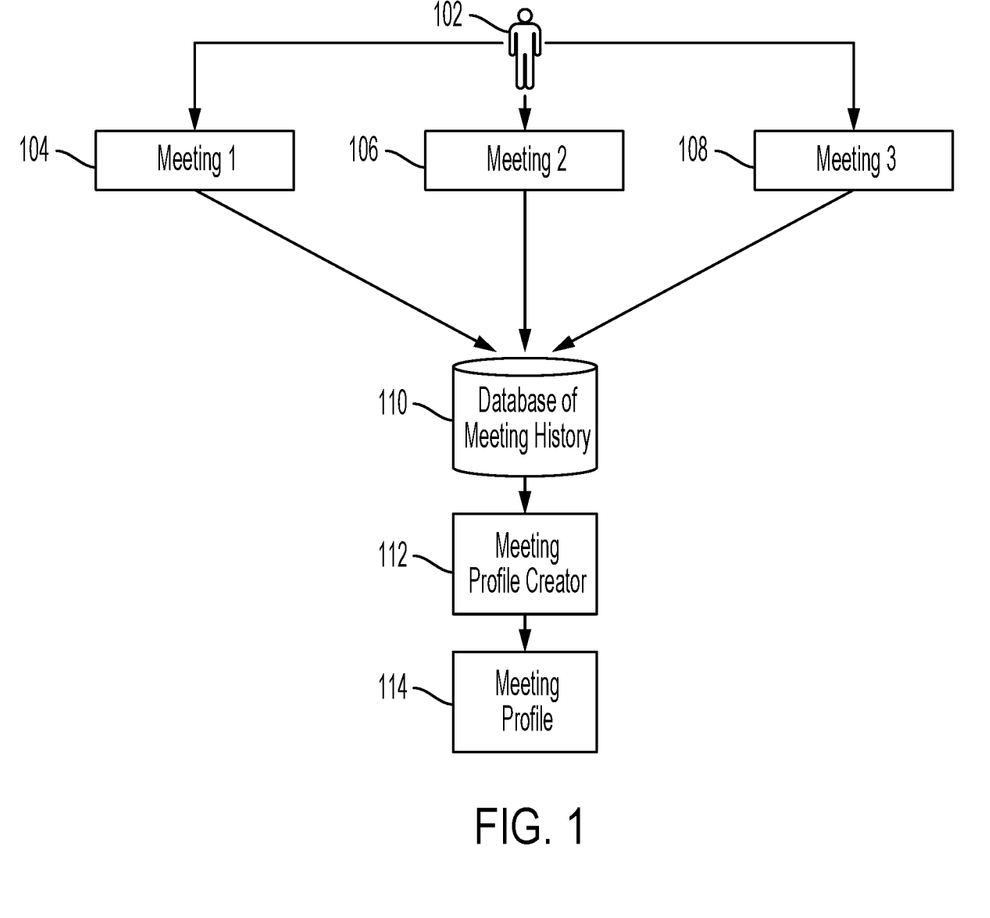
FIG. 1 illustrates an example of meeting profile creation for an individual.

FIG. 1 illustrates an example of meeting profile 114 creation for an individual 102. In this example, the system obtains data about multiple meetings 104, 106, 108 in which the user 102 has participated. Examples of the data can include electronic transcripts of the meetings, where the electronic transcripts are generated using audio from the meetings and subjecting that audio to speech-to-text processing. The meeting data can also include tagged segments from the transcripts, the tagged segments having one or more metadata tags which identify some aspect of the segment. For example, a segment may be from when a particular participant is speaking, and the metadata tag for a segment may indicate that participant was the speaker during that segment. Other potential tags can include the context for the segment, who was present within the meeting, and/or other aspects of the meeting featured in the particular portion of the meeting represented by a given segment.

In an exemplary embodiment, a list of potential tags can be pre-configured for the particular implementation. For example, "fraud" and "banking" may be tags provided in a set of tags for use at a financial institution. Other implementations may include tags relevant to that use case. The list of potential tags may also initially be empty and added to via machine learning. Along those lines, words not in this initial set, but that come up frequently across the enterprise (excluding "the", "and", etc.) may also be included as potential tags. This may be done by machine learning, tracking the number of times a word is encountered, etc. Thus, the list of potential tags may be dynamic. The system may attempt to extract all tags detected and determines necessity by those that match the dynamic list.

The system stores this data in one or more databases of meeting history 110. Preferably, only the tagged segments are stored within the database, though in some configurations storing the original audio and/or video can occur. The tags may be stored in a database, and arranged in their own table. For example, the database may include a relation indicating "fraud in segment 34239"; and a second "banking in segment 34239"; and so on, for all segments stored.

The system uses the meeting data stored in the database of meeting history 110 as inputs to the meeting profile creator 112, which can be a distinct processor, component, or other module of the system, or which can be specific code executed by a processor to manipulate the meeting data provided into a meeting profile 114 which is specific to the user 102.

Figure 2:
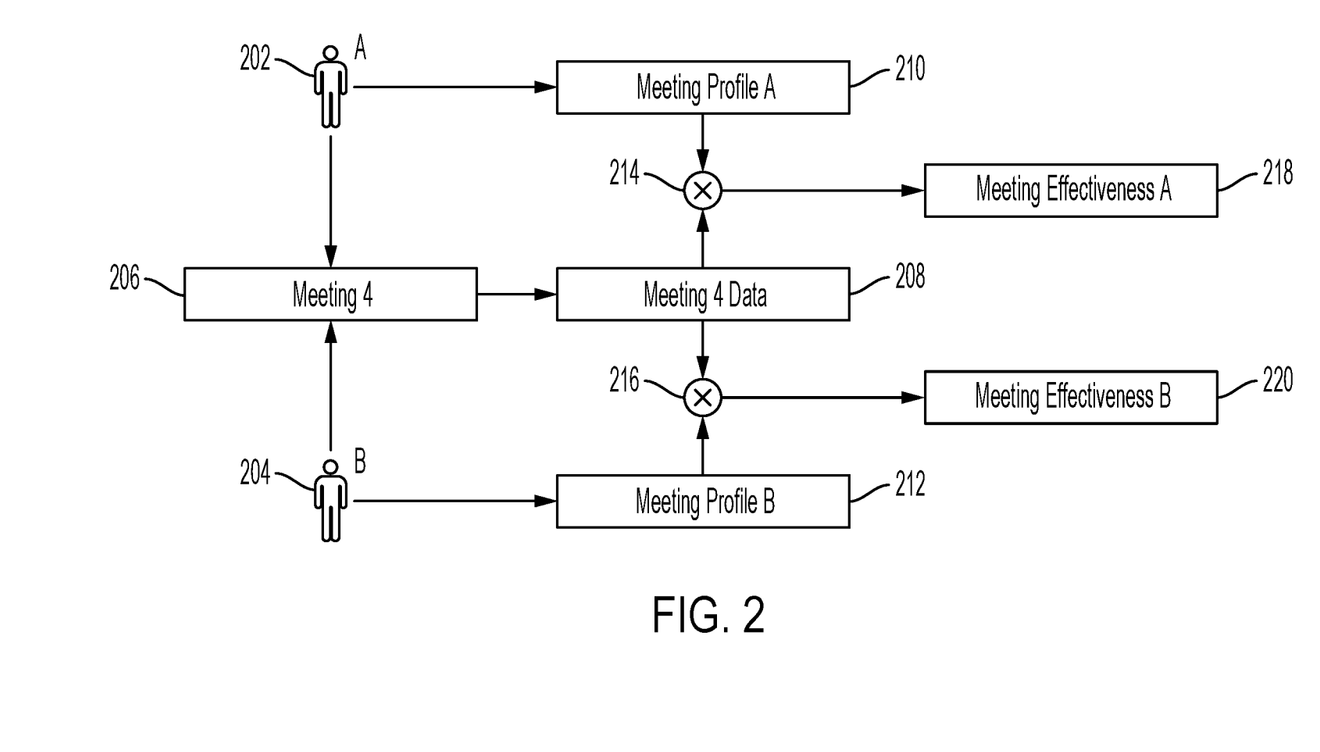
FIG. 2 illustrates an example of scoring a single meeting's effectiveness for two different individuals.

FIG. 2 illustrates an example of scoring a single meeting's 206 effectiveness for two different individuals 202, 204. In this example, individual meeting profiles for both A 202 and B 204 have already been created by the system according to the process illustrated in FIG. 1. As illustrated in FIG. 2, both individuals A 202 and B 204 participate in a meeting #4, and the system generates data about the fourth meeting 208. The system retrieves two separate meeting profiles 210, 212, one of reach individual 202, 204, then individually compares 214, 216 the meeting data 208 to the respective profiles, resulting in a meeting effectiveness score A 218 for user A 202, and a meeting effectiveness score B 220 for user B.

The process for generating scores may be configurable based on particular needs. In one example, a score may be the probability that a meeting influenced an individual multiplied by the determined magnitude of influence. This probability may be determined based on detecting any change in how an individual is speaking/acting in the future (from NLP). The magnitude may be be from the significance of this.

Consider an example. Suppose user A talks about the tag "AWS" 2 times on average, per day. After meeting number 1000, A now talks about "AWS" 6 times on average, per day. We can say the magnitude of this was "3×" as it influenced their frequency of talking about AWS 3×. However, user A may have attended many meetings besides meeting 1000, so perhaps meeting 1000 was or was not the sole cause of their increased frequency. Thus, the tags in meeting 1000 are compared to other meetings that user A also attended. If all of these other meetings never mentioned AWS, and 1000 mentioned it 40 times. A high probability (0.99) may be assigned that meeting 1000 was responsible for their increase. Thus, meeting 1000 has a score of 0.99*3 for the user. Alternatively, it may be determined that meeting 1000 was just one of many meetings discussing AWS, and other meetings mentioned AWS even more. This could give meeting 1000 0.20 probability of influence, so the score is 0.2*3 for user A.

In some configurations, the generation of the meeting effectiveness scores 218, 220 can occur via two parallel processes, thereby reducing the amount of time required to identify meeting effectiveness for the individuals 202, 204. In other configurations, the respective meeting effectiveness scores 218, 220 can be calculated sequentially, which may take longer but reduce the amount of power the system is required to exert in a given moment.

Figure 3:
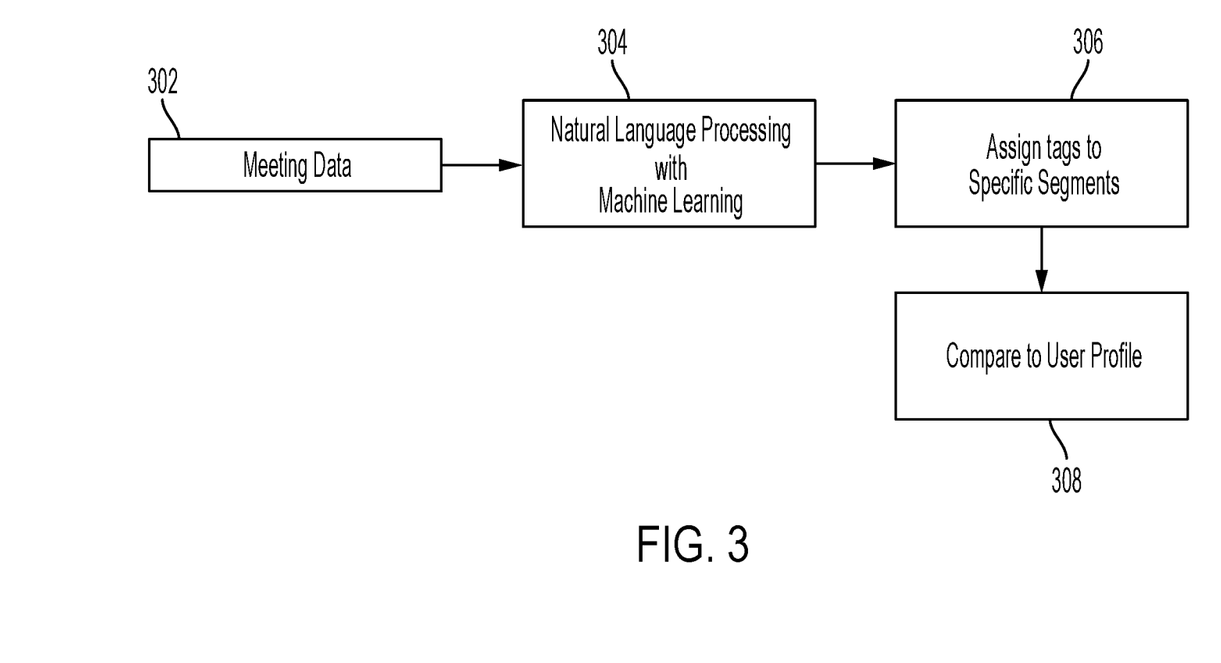
FIG. 3 illustrates an example of quantifying a meeting and comparing those metrics to a user profile.

FIG. 3 illustrates an example of quantifying a meeting and comparing those metrics to a user profile. In this example, meeting data 302 is received by the system. Examples of meeting data 302 can include electronic transcripts of meetings between multiple participants. In the case of a conference call, the voice transcript can be converted from audio to text using speech-to-text processing, and the system can receive the produced electronic transcript as the meeting data. Included within the electronic transcript of the conference call can be additional data, such as when participants joined or left the call, which participants were speaking at a given time, any chat/text messages shared during the conference call, slides or illustrates shared during the call, etc. In some configurations, and based on individual privacy settings, information about the behavior of the participants during the conference call can be included in the meeting data, such as if a participant was taking notes, browsing the Internet, on mute and on a second call simultaneously, etc.

In the case of a meeting where participants are physically present, audio of the meeting can be processed in a similar manner to that of a conference call. If video of the meeting is available, the audio of the meeting can likewise be processed in a similar manner to that of a conference call, however the system can also do image-based processing to identify actions of specific users within the meeting, such as standing up, walking around, pointing to people and/or objects, etc., with those additional actions identified included as meeting data.

In the case of a group chat or chat conference, the meeting data can be the text transcript of the chat, as well as any data about what slides or other materials are being presented within the chat. In necessary circumstances, the system can perform OCR (Optical Character Recognition) on any slides, frames of video, or other graphics presented, thereby extracting text which can be analyzed by the system as disclosed herein.

Meeting data can be gathered from databases and/or directly from a meeting input source (such as microphones, video cameras, speech-to-text processors, etc. The meeting data can then be parsed using natural language processing with machine learning algorithms 304, which can identify, from the meeting data, aspects of different parts of the meeting, such as context of the meeting at a given moment, vocabulary used, syntax of the speaker, etc. This parsed transcript information can be divided into segments based on one or more factors. For example, a meeting can be divided into minute segments, with each minute segment having an identified context, information about who is speaking, who is present, what information is being shared, etc. As another example, segments can be created for each sentence spoken within the meeting, whereas in another configuration segments can be created each time the speaker within a meeting changes, such that a segment ends, and a new segment begins every time there is a change of speaker within the meeting. In yet another example, the system can determine when the context of a meeting changes, and divide the meeting into segments based on a change of context.

The system can iteratively improve how the segments are identified and divided using machine learning, where the code the processor executes is modified to either (1) provide improved segments, or (2) speed up the rate at which the segments are recognized and divided. In both cases, the system executes the machine learning by identifying common patterns within the segments identified and reducing the number of steps required for the processor to identify the common patterns identified.

With the segments divided, the system can assign tags to the specific segments 306, with the tags assigned based on data identified within the segment. In some cases, as described above, that data can be used to create the segment, and the tags assigned correspond to the reason for the specific start/stop points of the segment. In other cases, the segment may be identified by the system for a specific reason with other tags assigned which are unrelated to the reason for the segment start/stop points. For example, in one situation a new segment may be generated each time a new speaker begins speaking, and tags can be added to the segments identifying who the speaker is, what the context of the segment is, who were the other participants, etc. In another example, a new segment can be generated each time the system determines that the context of the meeting has shifted (determined by vocabulary, pauses, change of speaker, etc.), such that the segment may contain dialogue from multiple individuals, and the overall segment has tags identifying aspects such as the overall context, participants, etc., as well as time related tags (timestamps) of the segment.

Figure 4:
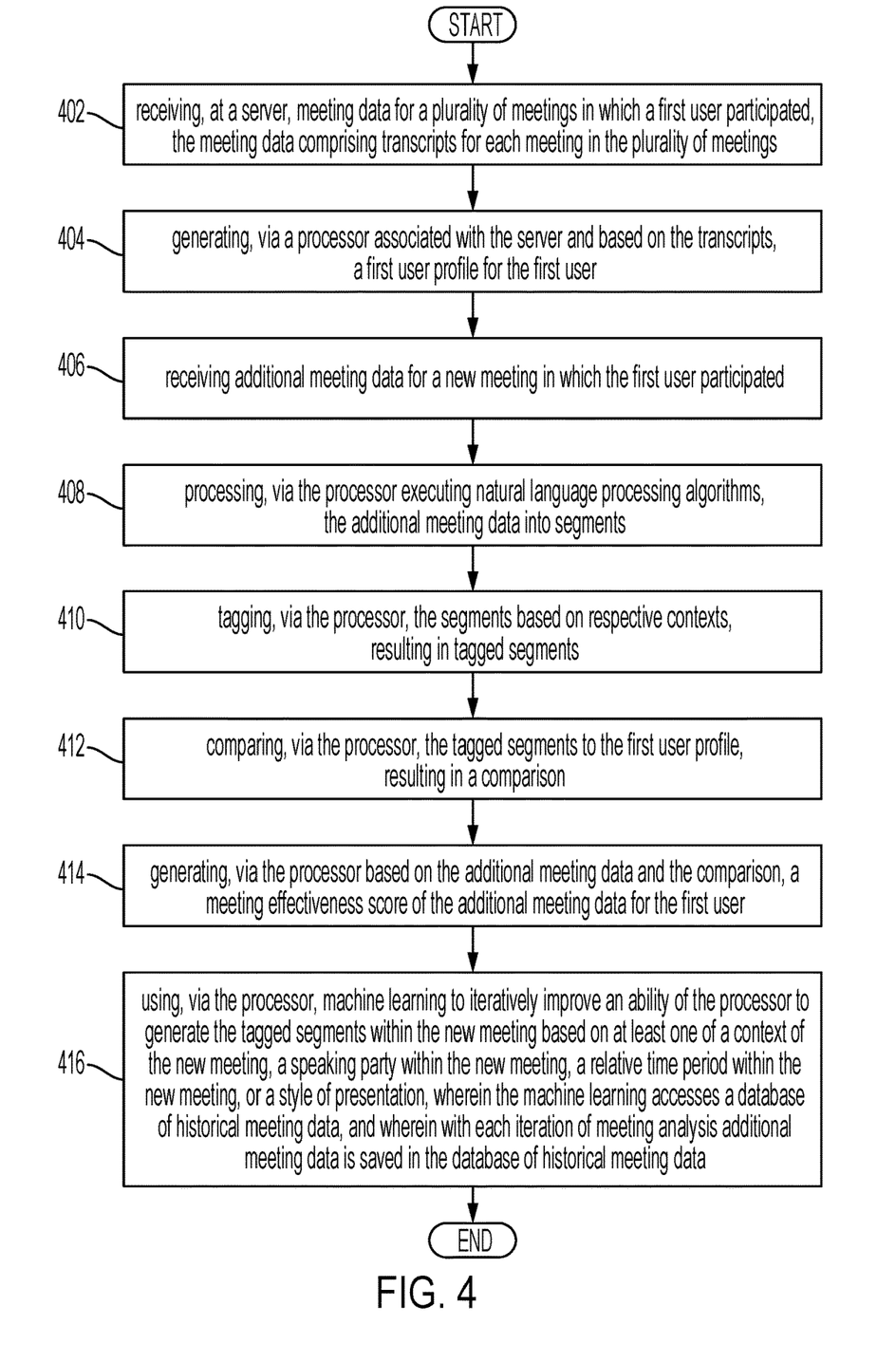
FIG. 4 illustrates an example method embodiment.

FIG. 4 illustrates an example method embodiment. The steps outlined herein are exemplary and can be implemented in any combination thereof, including combinations that exclude, add, or modify certain steps. As illustrated, a system (such as a server) receives meeting data for a plurality of meetings in which a first user participated, the meeting data comprising transcripts for each meeting in the plurality of meetings (402), and generates, via a processor associated with the server and based on the transcripts, a first user profile for the first user (404). The system receives additional meeting data for a new meeting in which the first user participated (406) and processes, via the processor executing natural language processing algorithms, the additional meeting data into segments (408). The system identifies contexts of these segments, and tags, via the processor, the segments based on respective contexts, resulting in tagged segments (410). The system compares, via the processor, the tagged segments to the first user profile, resulting in a comparison (412), and generates, via the processor based on the additional meeting data and the comparison, a meeting effectiveness score of the additional meeting data for the first user (414). The system then uses, via the processor, machine learning to iteratively improve an ability of the processor to generate the tagged segments within the new meeting based on at least one of a context of the new meeting, a speaking party within the new meeting, a relative time period within the new meeting, or a style of presentation, wherein the machine learning accesses a database of historical meeting data, and wherein with each iteration of meeting analysis additional meeting data is saved in the database of historical meeting data (416).

In some configurations, the executing of the natural language processing algorithms further includes identifying the respective contexts based on an order of words within each segment in the segments.

In some configurations, the tagged segments are stored in the database of historical meeting data, the tagged segments forming a complete electronic transcript of respective meetings. Likewise, in some configurations, the tagged segments are stored in the database of historical meeting data, the tagged segments each comprising an audio recording of the tagged segment and at least one tag.

In some configurations, the natural language processing algorithms can identify speakers within the new meeting, where the segments are segmented based upon the speakers, such that each time a change of speaker occurs a new segment begins, and the meeting effectiveness score is based, at least in part, on an amount of time a given speaker speaks within the new meeting.

In some configurations, the meeting effectiveness score is based, at least in part, upon a predefined metric obtained from the first user.

In some configurations the method illustrated in FIG. 4 can be augmented to include: generating, via the processor associated with the server and based on the meeting data, a second user profile for a second user; comparing, via the processor, the tagged segments to the second user profile, resulting in a second comparison; and generating, via the processor based on the additional meeting data and the second comparison, a second meeting effectiveness score for the second user, wherein the second meeting effectiveness score is distinct from the meeting effectiveness score of the first user.

As another example of expanding the method illustrated in FIG. 4, the method can further include generating, based upon the meeting effectiveness score, a recommendation for a subsequent meeting topic.

In yet another example of expanding the method of FIG. 4, the method can further include: generating, based upon the meeting effectiveness score, a recommendation for a subsequent meeting with a specified individual.

As still another example of augmenting the method illustrated in FIG. 4, the method can further include generating, based on the meeting effectiveness score and user profiles of additional users, a recommendation for the first user to engage in a team meeting with the additional users, the user profiles of additional users generated based upon meeting interactions of the additional users.

Figure 5:
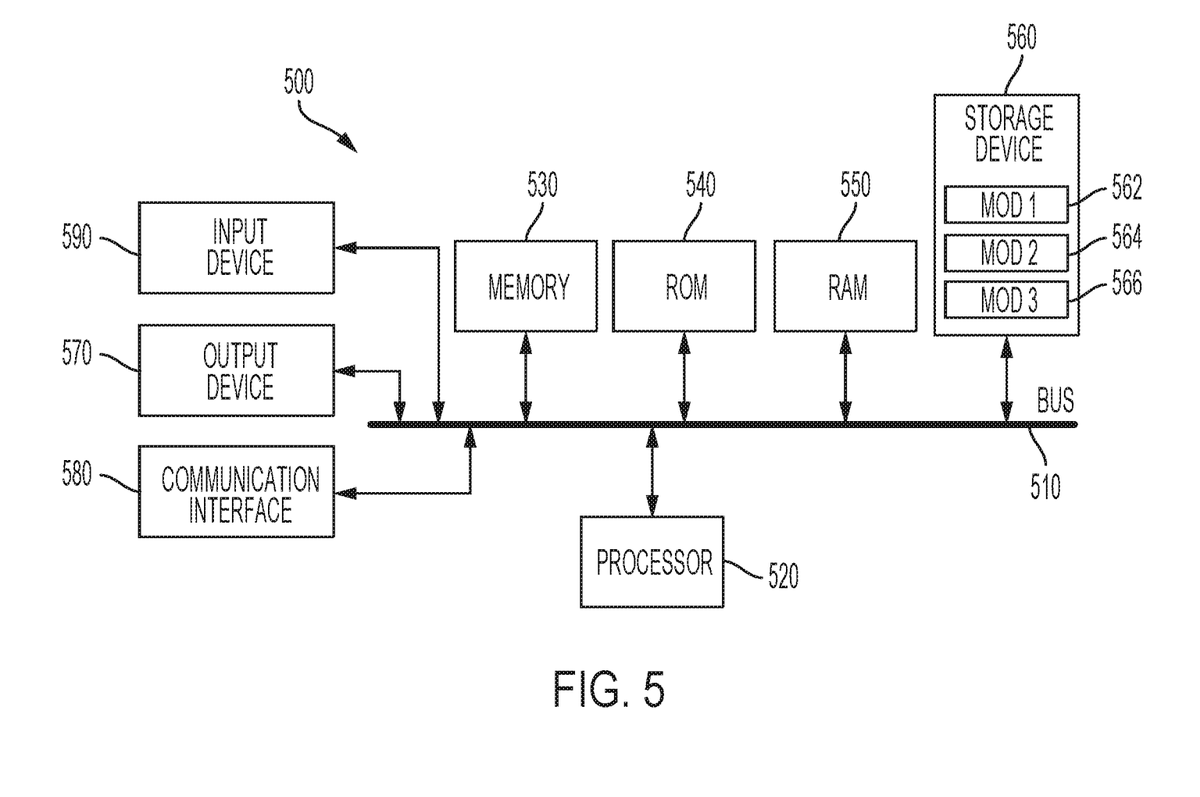
FIG. 5 illustrates an example computer system.

With reference to FIG. 5, an exemplary system includes a general-purpose computing device 500, including a processing unit (CPU or processor) 520 and a system bus 510 that couples various system components including the system memory 530 such as read-only memory (ROM) 540 and random access memory (RAM) 550 to the processor 520. The system 500 can include a cache of high-speed memory connected directly with, in close proximity to, or integrated as part of the processor 520. The system 500 copies data from the memory 530 and/or the storage device 560 to the cache for quick access by the processor 520. In this way, the cache provides a performance boost that avoids processor 520 delays while waiting for data. These and other modules can control or be configured to control the processor 520 to perform various actions. Other system memory 530 may be available for use as well. The memory 530 can include multiple different types of memory with different performance characteristics. It can be appreciated that the disclosure may operate on a computing device 500 with more than one processor 520 or on a group or cluster of computing devices networked together to provide greater processing capability. The processor 520 can include any general purpose processor and a hardware module or software module, such as module 1 562, module 2 564, and module 3 566 stored in storage device 560, configured to control the processor 520 as well as a special-purpose processor where software instructions are incorporated into the actual processor design. The processor 520 may essentially be a completely self-contained computing system, containing multiple cores or processors, a bus, memory controller, cache, etc. A multi-core processor may be symmetric or asymmetric.

The system bus 510 may be any of several types of bus structures including a memory bus or memory controller, a peripheral bus, and a local bus using any of a variety of bus architectures. A basic input/output (BIOS) stored in ROM 540 or the like, may provide the basic routine that helps to transfer information between elements within the computing device 500, such as during start-up. The computing device 500 further includes storage devices 560 such as a hard disk drive, a magnetic disk drive, an optical disk drive, tape drive or the like. The storage device 560 can include software modules 562, 564, 566 for controlling the processor 520. Other hardware or software modules are contemplated. The storage device 560 is connected to the system bus 510 by a drive interface. The drives and the associated computer-readable storage media provide nonvolatile storage of computer-readable instructions, data structures, program modules and other data for the computing device 500. In one aspect, a hardware module that performs a particular function includes the software component stored in a tangible computer-readable storage medium in connection with the necessary hardware components, such as the processor 520, bus 510, display 570, and so forth, to carry out the function. In another aspect, the system can use a processor and computer-readable storage medium to store instructions which, when executed by the processor, cause the processor to perform a method or other specific actions. The basic components and appropriate variations are contemplated depending on the type of device, such as whether the device 500 is a small, handheld computing device, a desktop computer, or a computer server.

Although the exemplary embodiment described herein employs the hard disk 560, other types of computer-readable media which can store data that are accessible by a computer, such as magnetic cassettes, flash memory cards, digital versatile disks, cartridges, random access memories (RAMs) 550, and read-only memory (ROM) 540, may also be used in the exemplary operating environment. Tangible computer-readable storage media, computer-readable storage devices, or computer-readable memory devices, expressly exclude media such as transitory waves, energy, carrier signals, electromagnetic waves, and signals per se.

To enable user interaction with the computing device 500, an input device 590 represents any number of input mechanisms, such as a microphone for speech, a touch-sensitive screen for gesture or graphical input, keyboard, mouse, motion input, speech and so forth. An output device 570 can also be one or more of a number of output mechanisms known to those of skill in the art. In some instances, multimodal systems enable a user to provide multiple types of input to communicate with the computing device 500. The communications interface 580 generally governs and manages the user input and system output. There is no restriction on operating on any particular hardware arrangement and therefore the basic features here may easily be substituted for improved hardware or firmware arrangements as they are developed.

Use of language such as "at least one of X, Y, and Z," "at least one of X, Y, or Z," "at least one or more of X, Y, and Z," "at least one or more of X, Y, or Z," "at least one or more of X, Y, and/or Z," or "at least one of X, Y, and/or Z," are intended to be inclusive of both a single item (e.g., just X, or just Y, or just Z) and multiple items (e.g., {X and Y}, {X and Z}, {Y and Z}, or {X, Y, and Z}). The phrase "at least one of" and similar phrases are not intended to convey a requirement that each possible item must be present, although each possible item may be present.

The various embodiments described above are provided by way of illustration only and should not be construed to limit the scope of the disclosure. Various modifications and changes may be made to the principles described herein without following the example embodiments and applications illustrated and described herein, and without departing from the spirit and scope of the disclosure.

We claim:

1. A method comprising:
generating a user profile for a user based on transcripts of a plurality of meetings in which the user participated;
receiving additional meeting data for a new meeting in which the first user participated;
processing, using a machine learning process, a transcript of the additional meeting data into transcript segments and a set of tags associated with the transcript segments, wherein the set of tags is determined by tagging each respective segment of the transcript segments based on a respective context of the respective segment;
generating a meeting effectiveness score based on the set of tags and the user profile by comparing the set of tags to the user profile;
updating, based on the meeting effectiveness score and common patterns within the transcript segments, the machine learning process to improve an ability of the machine learning process to generate the transcript segments; and
storing values of the updated machine learning process in a memory.

2. The method of claim 1, wherein using the machine learning process comprises, for a respective segment of the transcript segments,
identifying a respective context of the respective segment based on an order of words within the respective segment.

3. The method of claim 1, wherein the machine learning process accesses a database of historical meeting data, and wherein with each iteration of meeting analysis additional meeting data is saved in the database of historical meeting data, and wherein tagged segments comprises the set of tags and the transcript segments, and wherein the tagged segments are stored in the database of historical meeting data, the tagged segments forming a complete electronic transcript of respective meetings.

4. The method of claim 1, wherein the machine learning process accesses a database of historical meeting data, and wherein with each iteration of meeting analysis additional meeting data is saved in the database of historical meeting data, and wherein tagged segments comprises the set of tags and the transcript segments, and wherein the tagged segments are stored in the database of historical meeting data, the tagged segments each comprising an audio recording of a tagged segment of the tagged segments and at least one tag.

5. The method of claim 1, wherein:
the machine learning process identifies speakers within the new meeting;
the transcript segments are segmented based upon the speakers, such that each time a change of speaker occurs a new segment begins; and
the meeting effectiveness score is based on an amount of time a given speaker speaks within the new meeting.

6. The method of claim 1, wherein the user is a first user, and wherein the meeting effectiveness score is based upon a predefined metric obtained from the first user.

7. The method of claim 1, further comprising:
generating a second user profile for a second user;
comparing the set of tags to the second user profile, resulting in a second comparison; and
generating, based on the additional meeting data and the second comparison, a second meeting effectiveness score for the second user, wherein the second meeting effectiveness score is distinct from the meeting effectiveness score of the user.

8. The method of claim 1, further comprising:
generating, based upon the meeting effectiveness score, a recommendation for a subsequent meeting topic.

9. The method of claim 1, further comprising:
generating, based upon the meeting effectiveness score, a recommendation for a subsequent meeting with a specified individual.

10. The method of claim 1, further comprising:
generating, based on the meeting effectiveness score and user profiles of additional users, a recommendation for the first user to engage in a team meeting with the additional users, the user profiles of the additional users generated based upon meeting interactions of the additional users.

11. The method of claim 1, wherein processing the transcript into segments comprises:
determining a set of audio segments based on audio data of the new meeting;
determining an initial set of contexts based on the set of audio segments by, for each respective audio segment of the set of audio segments, determining a respective context of the respective audio segment;

detecting a set of context changes between different portions of the initial set of contexts; and determining the transcript segments based on the set of context changes.

12. A system comprising:

a processor; and a non-transitory computer-readable storage medium having instructions stored which, when executed by the processor, cause the processor to perform operations comprising:

using a machine learning process to perform natural language processing on an audio input of a meeting between a plurality of individuals in which a speaker participates to obtain a plurality of segments and a set of contexts associated with the plurality of segments;

generating a meeting score based on a user profile and the set of contexts by comparing the user profile to the set of contexts or a set of tags derived from the set of contexts;

updating weights of the machine learning process to reduce a computational cost of obtaining the plurality of segments based on the meeting score and common patterns within the plurality of segments; and storing the weights of the updated machine learning process in a memory.

13. The system of claim 12, wherein updating weights of the machine learning process is based on at least one of a context of the meeting, a speaking party within the meeting, a relative time period within the meeting, or a style of presentation.

14. The system of claim 13, wherein updating weights of the machine learning process comprises by accessing a database of historical meeting data, wherein with each iteration of meeting analysis additional meeting data is saved in the database of historical meeting data.

15. The system of claim 14, wherein the machine learning process accesses a database of historical meeting data, and wherein with each iteration of meeting analysis additional meeting data is saved in the database of historical meeting data, and wherein tagged segments comprises the set of tags and the plurality of segments, and wherein the database of historical meeting data stores tagged segments, the tagged segments each comprising an audio recording and at least one corresponding tag.

16. The system of claim 12, wherein the meeting score is further based on an amount of time a given speaker speaks within the meeting.

17. The system of claim 12, wherein the user profile is a profile of a user, and wherein the meeting score is further based upon a predefined metric obtained from the user.

18. The system of claim 12, the non-transitory computer-readable storage medium having additional instructions stored which, when executed by the processor, cause the processor to perform operations comprising:

generating, based upon the meeting score, a recommendation for a user to engage in a subsequent meeting topic, wherein the user profile is a profile of the user.

19. The system of claim 12, the non-transitory computer-readable storage medium having additional instructions stored which, when executed by the processor, cause the processor to perform operations comprising:

generating, based upon the meeting score, a recommendation for a user to engage in a subsequent meeting with a specified individual, wherein the user profile is a profile of the user.

20. The system of claim 12, the non-transitory computer-readable storage medium having additional instructions stored which, when executed by the processor, cause the processor to perform operations comprising:

changing a scheduled future meeting based on the meeting score.

21. A non-transitory computer-readable storage medium having instructions stored which, when executed by a processor, cause the processor to perform operations comprising:

receiving a meeting score, wherein the meeting score is generated by:

performing natural language processing on audio input from a meeting, resulting in a transcript of the audio input;

using a machine learning process based on the transcript of the audio input to determine a set of segments and a set of contexts for each respective segment of the set of segments;

comparing a user profile of a user to the set of segments and the set of contexts to determine a comparison; and generating the meeting score of the meeting based on the comparison;

updating weights of the machine learning process to reduce a computational cost of obtaining the set of segments based on the meeting score and common patterns within the set of segments; and storing the weights of the updated machine learning process in a memory.

* * * * *